United States Patent Office 3,741,812
Patented June 26, 1973

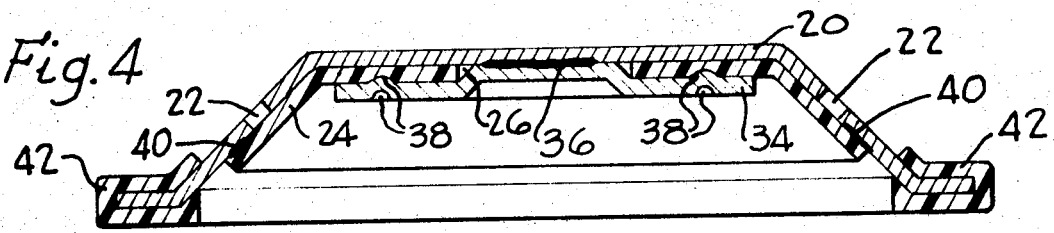
Fig. 4
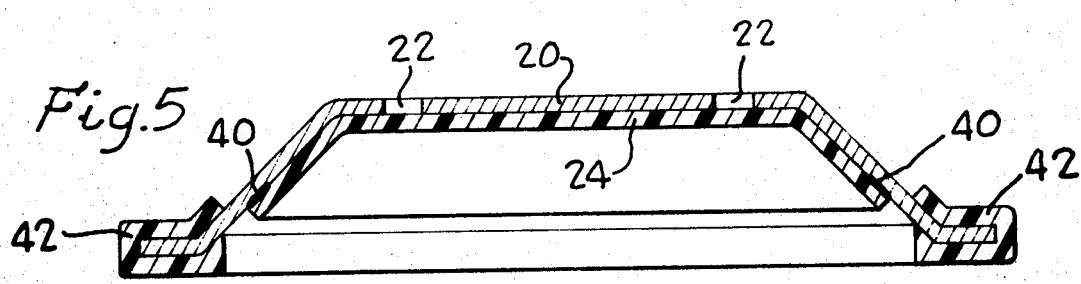
Fig. 5
Fig. 6
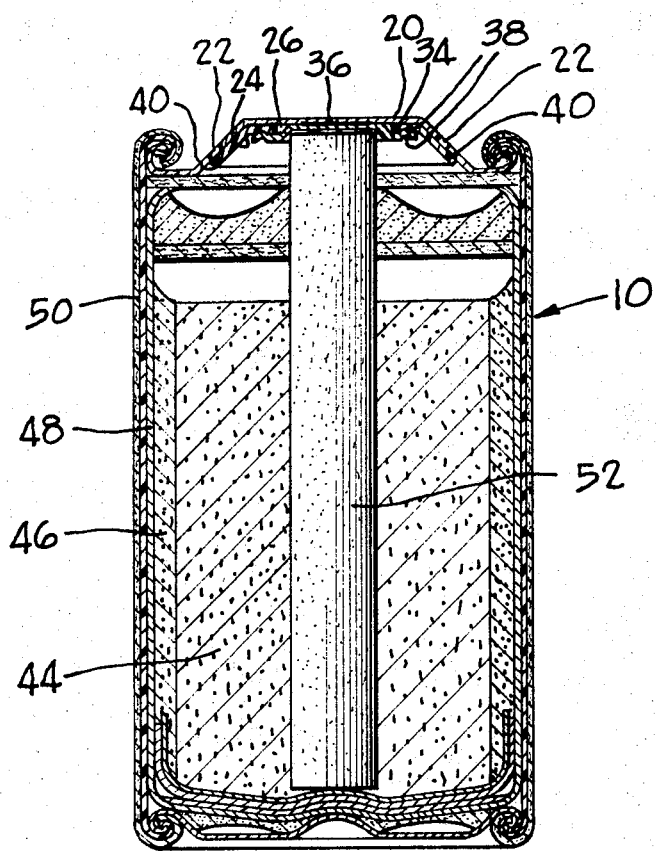

3,741,812
BATTERY HAVING GAS PERVIOUS, LIQUID IMPERVIOUS MEMBER SEALED OVER HOLE IN TOP
Patrick J. Spellman and John E. Oltman, Madison, and Gerald Sanden, Verona, Wis., assignors to ESB Incorporated
Filed Nov. 3, 1971, Ser. No. 195,371
Int. Cl. H01m 21/00
U.S. Cl. 136—107                    10 Claims

ABSTRACT OF THE DISCLOSURE

A hole in the top of a battery is covered by a gas pervious, liquid impervious member secured to the interior surface of the top in a manner which provides a liquid-tight closure around the hole. The gas pervious, liquid impervious member may be extended to and around the edge of the top where it is crimped by the container and where it functions as a grommet to provide a liquid-tight closure around the perimeter of the top. The gas pervious, liquid impervious member may be crimped between the top and an electrically conductive current collector which is secured to the top. Constructions are illustrated in which the gas pervious, liquid impervious member is electrically nonconductive, while other constructions are shown in which the member is conductive.

BACKGROUND OF THE INVENTION

Batteries have previously been designed in which a hole extending between the interior and exterior of the battery container was covered by a member which is pervious to gases but impervious to liquids. These members were included to permit gases to enter or leave the battery while preventing liquids from doing the same. In some cases these members were designed to be permeable to some gases but not to other gases.

In United States Pat. No. 2,693,499 for example, a liquid impervious diaphragm is placed in the interior of the cell and over a hole in the bottom of the battery container. The diaphragm, which may be made from a plastic material such as a polyvinyl chloride or polyethylene, is much more permeable to hydrogen than it is to oxygen, and this characteristic of the material is used to control the relative amounts of hydrogen and oxygen inside the cell and hence to affect the state of charge of the electrodes.

In United States Pat. No. 2,759,038 an air-depolarized cell is provided with a covering which extends over the exterior of vent openings or breather ports. This covering, which may be made from polyethylene or ethylene cellulose, prevents moisture from leaving the cell but permits the required oxygen from the air to enter. The covering also substantially prevents nitrogen and carbon dioxide from entering the cell.

A hole communicating between the exterior and interior of a battery has also been covered with a material or foil which is impervious to both gases and liquids. An example of such a construction is shown in United States Pat. No. 3,489,616. In that patent the foil is used to seal aeration holes in an air-depolarized cell until it is desired to activate the cell, at which time the foil is torn off.

Regardless of whether these liquid impervious, hole sealing members are pervious or impervious to gases, they must be secured to the container in some manner which provides a liquid-tight seal around the hole that extends between the interior and the exterior of the cell. The cell must also be provided with liquid-tight seals at other locations throughout the assembly. Finally, the liquid impervious, hole sealing members must be constructed or positioned in such a manner that the desired electrical paths are obtained in the cell and undesired electrical paths are prevented.

SUMMARY OF THE INVENTION

With this invention a gas pervious, liquid impervious member which seals across a hole in and on the inside of the battery top is used together with other components of the battery to accomplish new and additional results.

In one family of embodiments, the gas pervious, liquid impervious, hole sealing member serves the new, dual function of a grommet between the top and the container means for the battery. In this role the member is crimped between the top and the container means to provide a liquid-tight closure around the perimeter of the top. Also while in this role the member, when made from an electrically nonconductive material, may serve the additional function of an insulator between the top and the container means, each of which is in electrical contact with one of the electrodes.

In other embodiments the gas pervious, liquid impervious, hole sealing member may have an opening therein which exposes an electrically conductive top, and a conductive current collector may extend through this opening and be secured to the top. The current collector and the top may be crimped around the gas pervious, liquid impervious member to provide a liquid-tight seal.

The invention is useful with cells having internally stored depolarizing or oxidizing electrodes as well as those which draw their depolarizing oxygen from the air outside the cell.

BRIEF DESCRIPTION OF THE DRAWINGS

FIGS. 4 and 5 illustrate alternatives to the construction shown in FIG. 3.

FIG. 6 is a cross-section of another cell embodying features of the invention.

DESCRIPTION OF THE PREFERRED EMBODIMENTS

Figure 1:
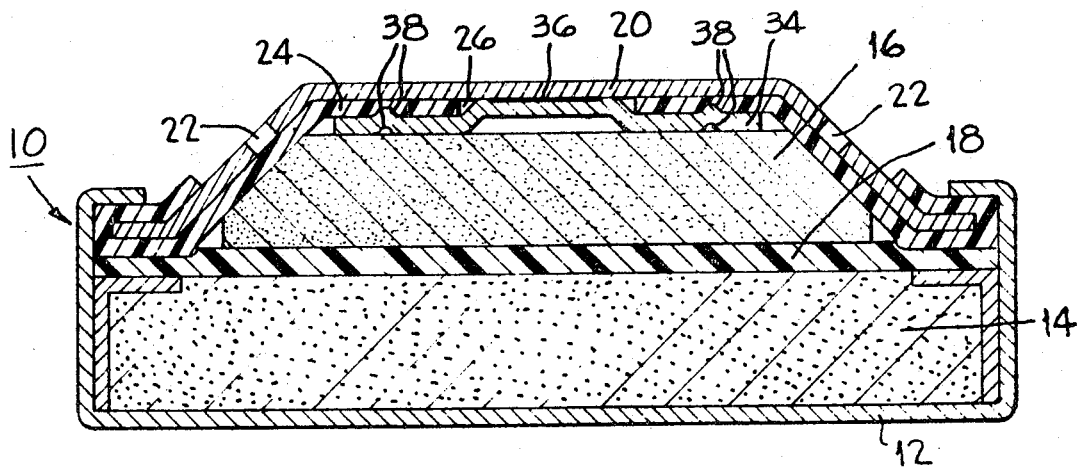
FIG. 1 is a cross-section of a battery which illustrates one embodiment of this invention.
Figure 2:
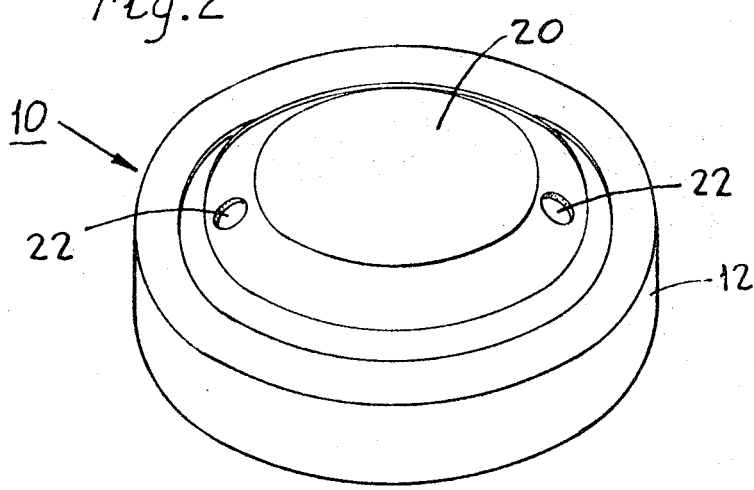
FIG. 2 is a perspective view of the battery shown in FIG. 1.

FIG. 1 illustrates in cross-section and FIG. 2 illustrates in perspective a battery 10 embodying certain features of the present invention. The battery includes external means 12 for confining a positive electrode 14, a negative electrode 16, and electrolyte. The electrolyte may be contained in a separator or barrier 18 spaced between the electrodes. While the particular container means 12 illustrated in FIG. 1 is a single piece metallic can which is in electrical contact with electrode 16, container means for the electrodes and electrolyte which have different constructions and compositions will be illustrated and described hereinafter.

The battery shown in FIGS. 1 and 2 also has a top 20 that has at least one hole 22 which extends between the interior and the exterior of the containing means, the hole being the passageway through which gases may enter or leave the battery. A member 24 made from a material which is pervious to certain gases but impervious to liquids extends across a portion of the inner surface of the top 20 to cover and seal over the hole 22. The member 24 also extends to and around the edge of the top 20. The member 24 has an opening 26 through which an electrically conductive current collector 34 extends to be in electrical contact with and secured at 36 to the top 20 by welding, riveting, or other appropriate means; the top 20 is thus electrically connected to one of the electrodes 14 through current collector 34. The current collector 34 and the top 20 are preferably crimped around the member 24 as at 38 to provide the liquid-tight seal between the hole 22 in the top 20 and the opening in the member 24. The top 20 with the gas pervious, liquid impervious member 24 are shown assembled into a battery in FIGS. 1 and 2 and are shown separately from the remainder of the battery in FIG. 3.

As one of the novel aspects of this invention, the container 12 is crimped around the gas pervious, liquid impervious member 24 in such a manner as to provide a liquid-tight closure aronnd the perimeter of the top. In this arrangement of parts the member 24 functions in the manner of a conventional grommet and, by being made from an electrically nonconductive material, the member 24 may serve the still additional function of an electrical insulator which prevents undesired electrical contact between container 12 and top 20, each of which is in electrical contact with one of the battery electrodes.

Figure 3:
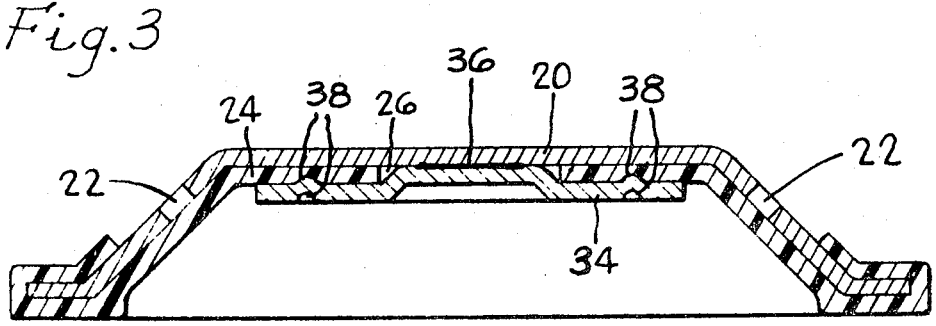
FIG. 3 is a cross-section of the top and gas pervious, liquid impervious member shown as parts of the battery in FIG. 1.

A variety of methods may be used to combine the gas pervious, liquid impervious member 24 with the top 20 to achieve the construction shown in FIGS. 1-3, with the most appropriate method depending in part upon the materials from which the member 24 and top 20 are made. Where the top 20 is metallic, the member 24 may be made from a plastic which is molded around the top, snap fitted over the top, or heat shrunk over the top.

To function as required by this invention the member 24 must be pervious to certain gases but impervious to liquids. The member 24 may permit the passage of gases by functioning in effect as a sieve, that is, by having pores which permit the passage of small gas molecules but which prevent the passage of larger molecules; in this case the size of the pores, and hence the size of the gas molecules which may pass through the pores, will depend on the particular material from which and the method by which the member 24 is made. The member 24 may also function differently, by a mechanism in which the gases pass through the member 24 by being first dissolved in the member. The size of the particular gas molecules which must pass through the member 24, or be prevented from passing through, should be determined taking into account the particular electrochemical system included in the cell. With cell systems in which an oxidizing compound is contained inside the cell, the usual desired result is to vent gases produced by discharge or overcharge from the inside to the outside of the cell, while with air-depolarized cells the usual objective would be to permit entry of oxygen from the exterior air to the interior of the cell while possibly excluding other gases.

FIG. 4 shows an alternative to the construction illustrated in FIGS. 1 and 3. In FIG. 4 the gas pervious, liquid impervious member 24 does not fulfill the role of a grommet. Instead the member 24 extends across a portion of the inner surface of the top only enough to extend across the hole 22 in the top 20 and is sealed to the top 20 at position 40. A separate grommet 42 is crimped between the container means 12 and the top 20. The grommet 42 may be from the same or a different material than the member 24, and the member 24 may be conductive while the grommet 42 is nonconductive.

FIG. 5 represents an alternative to the construction shown in FIG. 4. In FIG. 5 the member 24 is made from an electrically conductive material which functions as a current collector to make a separate member such as 34 shown in FIG. 4 unnecessary. The holes 22 in the top 20 are also shown relocated to a different position in FIG. 5.

FIG. 6 illustrates how the invention may be used with batteries having other configurations and constructions than the one shown in FIG. 1. Specifically, the top 20-member 24 combination illustrated separately in FIG. 4 is shown in FIG. 6 being included in a flashlight battery of conventional construction. The battery 10 shown in FIG. 6 has a positive electrode 44 (e.g., a mix of manganese dioxide and other materials), electrolyte 46, and a negative electrode 48 (e.g., a zinc can) all contained inside a containing means 50 of conventional construction which is electrically nonconductive (e.g., multiple-ply laminated tubes of plastic and papers). A porous carbon rod 52 projecting upward from the center of the positive electrode 44 makes electrical contact with the metallic top 20. Because the portion of the containing means 50 which is crimped around the gas pervious, liquid impervious member 24 is electrically insulated from the electrode 48, member 24 may be made from either conductive or nonconductive materials; in other words, the top 20-member 24 constructions illustrated in FIGS. 3 through 5 may each be used in FIG. 6.

As is apparent, the member 24 must have the property of being pervious to certain gases but impervious to liquids and moisture. Materials having this property include polyvinyl chloride, polyethylene, ethyl cellulose, and other polymeric materials, as well as palladium, palladium-silver alloys, and other metals and metallic alloys. Where the member 24 is required to be electrically conductive, that characteristic may be attained by including particles of carbon, graphite, or other conductive materials to render the plastic conductive.

As mentioned previously, this invention may be used with batteries containing positive electrodes which comprise oxidizing agents (e.g., manganese dioxide) as well as those which draw their oxygen through the hole 22 in the top 20 from the air outside the battery. The invention may be used in batteries having a wide variety of sizes and configurations, ranging from cylindrical batteries of the "C" and "D" size commonly used in flashlights and toys to miniature, thin "button" cells. Use of the invention in button cells which are relatively thin and which have relatively large diameters may be particularly desirable as a means of preventing, or at least confining within the tolerable limits, the bulging which results from internally generated gases. The ability to minimize bulging can become a very important factor where thin large diameter button cells are used in very thin applicances such as wrist watches.

Our invention differs from the so-called "double-top" construction described in U. S. Pats. #2,712,565; 3,096,217; and 3,457,117 even though embodiments of our invention may be used as alternatives to the "double-top" structure.

Having explained our invention, we claim:

1. A battery comprising the combination of:
 (a) electrically conductive means for containing a positive electrode, a negative electrode and electrolyte for a battery;
 (b) a positive electrode, a negative electrode, and electrolyte contained inside the containing means, the containing means being in electrical contact with one of the electrodes;
 (c) an electrically conductive top engaged and held in place by the containing means and in electrical contact with the other electrode, the top having at least one hole in it which extends from the interior to the exterior of the containing means; and,
 (d) an electrically nonconductive, gas pervious, liquid impervious member extending across at least a portion of the inner surface of the top and extending to and around the edge of the top, the containing means being crimped around the member in such a manner as to provide a liquid-tight closure around the perimeter of the top, the member also extending across the hole in the top, the member functioning as an insulator between the top and the containing means.

2. A battery comprising the combination of:
 (a) means for containing a positive electrode, a negative electrode and electrolyte for a battery;
 (b) a positive electrode, a negative electrode, and electrolyte contained inside the containing means;
 (c) a top engaged and held in place by the containing means, the top having at least one hole in it which extends from the interior to the exterior of the containing means; and, (d) a gas pervious, liquid impervious member extending across at least a portion of the inner surface of the top and extending to and around the edge of the top, the containing means being crimped around the member in such a manner as to provide a liquid-tight closure around the perimeter of the top, the member also extending across the hole in the top, the member having an opening therein which is offset from and separated by a liquid tight seal from the hole in the top, one of the electrodes being electrically connected to the top through the opening in the member.

3. The battery of claim 2 in which there is an electrically conductive current collector which extends through the opening in the gas pervious, liquid impervious member which is in electrical contact with and secured to the top, the current collector being electrically connected to one of the electrodes.

4. The battery of claim 3 in which the electrically conductive current collector and the top are crimped around the gas pervious, liquid impervious member to provide the liquid-tight seal between the hole in the top and the opening in the gas pervious, liquid impervious member.

5. The battery of claim 1 in which there is an opening in the gas pervious, liquid impervious member, the opening being offset from and separated by a liquid tight seal from the hole in the top, and in which one of the electrodes is electrically connected to the top through the opening in the gas pervious, liquid impervious member.

6. The battery of claim 5 in which there is an electrically conductive current collector which extends through the opening in the gas pervious, liquid impervious member which is in electrical contact with and secured to the top, the current collector being electrically connected to one of the electrodes.

7. The battery of claim 6 in which the electrically conductive current collector and the top are crimped around the gas pervious, liquid impervious member to provide the liquid-tight seal between the hole in the top and the opening in the gas pervious, liquid impervious member.

8. A battery comprising the combination of:
(a) means for containing a positive electrode, a negative electrode and electrolyte for a battery;
(b) a positive electrode, a negative electrode, and electrolyte contained inside the containing means;
(c) a top engaged and held in place by the containing means, the top having at least one hole in it which extends from the interior to the exterior of the containing means;
(d) an electrically conductive, gas pervious, liquid impervious member in electrical contact with one of the electrodes so that the member functions as a current collector, the member extending across at least a portion of the inner surface of the top and extending to and around the edge of the top, the containing means being crimped around the member in such a manner as to provide a liquid-tight closure around the perimeter of the top, the member also extending across the hole in the top, the portion of the containing means which is engaged by the member being electrically insulated from the electrode which is not electrically connected with the top; and,
(e) means for conducting electrical current between the member and the exterior of the top.

9. A battery comprising the combination of:
(a) means for containing a positive electrode, a negative electrode, and electrolyte for a battery;
(b) a positive electrode, a negative electrode, and electrolyte contained inside the containing means;
(c) a top engaged and held in place by the containing means, the top having at least one hole in it which extends from the interior to the exterior of the containing means;
(d) a gas pervious, liquid impervious member extending across at least a portion of the inner surface of the top and across the hole in the top, the gas pervious, liquid impervious member being electrically conductive and in electrical contact with one of the electrodes so that the member functions as a current collector, the gas pervious, liquid impervious member also being sealed around the hole in the top in a manner which provides a liquid-tight closure around the perimeter of the hole; and,
(e) means for conducting electrical current between the gas pervious, liquid impervious member and the exterior of the top.

10. A battery of claim 9 in which
(a) the top is electrically conductive and constitutes the means for conducting electrical current between the gas pervious, liquid impervious member and the exterior of the top; and
(b) the portion of the containing means which engages the top is electrically insulated from the other electrode.

References Cited
UNITED STATES PATENTS

| | | | |
|---|---|---|---|
| 2,693,499 | 11/1954 | Neumann | 136—177 |
| 2,759,038 | 8/1956 | Marsal | 136—136 |
| 2,797,254 | 6/1957 | Schumacher et at. | 136—177 |
| 2,812,377 | 11/1957 | Franquemont | 136—111 |
| 2,848,525 | 8/1958 | Schumacher et al. | 136—102 |
| 3,159,508 | 12/1964 | Chreitzberg | 136—166 |
| 3,218,197 | 11/1965 | Carmichael et al. | 136—133 |
| 3,489,616 | 1/1970 | Fangradt et al. | 136—107 |

ANTHONY SKAPARS, Primary Examiner

U.S. Cl. X.R.
136—111, 177